United States Patent
Silver

(10) Patent No.: US 8,398,902 B2
(45) Date of Patent: Mar. 19, 2013

(54) MOULDING LENSES

(76) Inventor: Joshua David Silver, Oxford (GB)

( * ) Notice: Subject to any disclaimer, the term of this patent is extended or adjusted under 35 U.S.C. 154(b) by 737 days.

(21) Appl. No.: 11/922,146

(22) PCT Filed: Jun. 8, 2006

(86) PCT No.: PCT/GB2006/002112
§ 371 (c)(1),
(2), (4) Date: Sep. 30, 2010

(87) PCT Pub. No.: WO2006/134328

PCT Pub. Date: Dec. 21, 2006

(65) Prior Publication Data

US 2011/0018150 A1    Jan. 27, 2011

(30) Foreign Application Priority Data

Jun. 13, 2005    (GB) .................................. 0512012.6

(51) Int. Cl.
*B29D 11/00*    (2006.01)
(52) U.S. Cl. ......... 264/1.38; 264/2.2; 264/2.5; 351/158; 425/808
(58) Field of Classification Search ................... 264/1.1, 264/2.2, 2.5, 2.7, 40.1, 1.36, 1.38; 425/808; 351/158, 179
See application file for complete search history.

(56) References Cited

U.S. PATENT DOCUMENTS 3,454,686 A * 7/1969 Jones ........................... 264/1.36
4,447,372 A * 5/1984 Kreuttner ....................... 264/2.2
6,830,712 B1   12/2004 Roffman et al.

FOREIGN PATENT DOCUMENTS

| | | |
|---|---|---|
| JP | 57207026 | 12/1982 |
| JP | 3284258 | 12/1991 |
| JP | 04284208 A | 8/1992 |
| JP | 5088004 | 4/1993 |
| JP | 11-002701 | 1/1999 |
| WO | 00/05060 A1 | 2/2000 |

OTHER PUBLICATIONS

Japanese Office Action for corresponding Application No. 2008-516396 dated Jun. 7, 2011, together with English translation.
Japanese Office Action for corresponding Application No. 2008-516396 dated Jan. 10, 2012, together with English translation.

\* cited by examiner

*Primary Examiner* — Mathieu D. Vargot
(74) *Attorney, Agent, or Firm* — Sughrue Mion, PLLC

(57) ABSTRACT

The invention provides a method of moulding a vision correction lens from a transparent resin. The resin is introduced into a mould cavity, the sides of which cavity which correspond to the front and rear surfaces of the lens being formed by two sheets, at least one of which is flexible. The amount of resin in the cavity is adjusted to deform the flexible sheet(s) so that the shape of the lens defined by the sheet(s) will provide a desired power, and the resin is then cured. The sheets can be transparent, and a user can look through them as the amount of resin is adjusted, to ensure that the lens is of the desired power. Further, the amount of resin in the cavity can be adjusted to accommodate changes in the refractive index of the resin as it cures.

9 Claims, 2 Drawing Sheets

MOULDING LENSES

This application is a 371 of PCT/GB2006/002112, filed Jun. 8, 2006; the entire disclosure of which is incorporated herein by reference.

The present invention relates to a method of moulding lenses, and more particularly to a method of moulding lenses in which the shape of the mould cavity is defined by at least one flexible sheet.

Ophthalmic lenses are commonly made from plastics material. The process starts with the moulding of a so-called "lens blank", one surface (normally the front) of which is formed with a curve (normally spherical). The curve imparts a known optical power to the blank. The other surface of the blank is then ground and polished to provide the desired overall optical power for the lens.

In a common form, the front curve of the moulded lens blank is +6 dioptres. Prescription lenses of less than +6 dioptres can then be made by appropriate grinding of the rear surface. For example, if a +2 dioptre prescription is required, a −4 dioptre curve is ground on the back surface. If a −2 dioptre prescription is required, a −8 dioptre curve is ground.

While this lens manufacturing process is commonly used, it is quite time-consuming, as the front and rear surfaces of the lens are formed in two distinct stages, the second of which (grinding and polishing the rear surface of the lens) is quite laborious. In addition, the step of moulding the lens blank requires the mould (or at least the part which forms the front surface of the lens blank) to be of optical quality, and such moulds can be expensive to manufacture.

According to a first aspect of the invention, there is provided a method of moulding a lens for correction of vision from a transparent resin, comprising the steps of providing a mould cavity in which the lens is to be moulded, the sides of the cavity which correspond to the front and rear surfaces of the lens being formed by two sheets, at least one of which is flexible; filling the mould cavity with a transparent resin; adjusting the amount of resin in the cavity to thereby deform the flexible sheet(s) so that the shape of the lens defined by the sheet(s) will provide a desired power; and curing the resin.

This method greatly simplifies the procedure for moulding a lens. Both faces of the lens can be produced in a single step, rather than requiring a two-step procedure as discussed above. Furthermore, there is no need to provide a mould of optical quality, which can reduce costs.

Preferably, the sheets are transparent. If this is the case, then the adjustment of the amount of resin in the cavity to deform the flexible sheet(s) can be carried out while the eventual user of the lens is looking through the transparent sheets and the resin, so that the shape and power of the lens can be adapted to suit to the eventual user's vision. This allows the lens to be "tailored" to the individual's specific requirements while still being produced relatively cheaply.

In a preferred form, the mould cavity is provided in an optical apparatus such as a pair of spectacles. The lens can then be effectively formed "in situ".

Preferably, two such mould cavities are provided in an optical apparatus such as a pair of spectacles. This allows simple production of a pair of spectacles providing correction in both of the user's eyes.

In an alternative preferred method, a second cavity is provided, the second cavity being similar to the mould cavity and having front and rear surfaces formed from transparent sheets, at least one of the sheets being flexible, the flexibility or otherwise of the sheets of the second cavity corresponding to the flexibility or otherwise of the corresponding sheets in the mould cavity, the cavity being filled with a transparent liquid; the eventual user of the lens looks through the second cavity, the amount of liquid in the second cavity is adjusted to thereby deform the flexible sheet(s) so that the shape of the lens defined by the sheets will provide a desired power, and the amount of resin in the mould cavity is adjusted in correspondence with the amount of liquid in the second cavity.

Although unlikely, it is possible that the sheets used to form the mould cavity may leak or burst. If this were to happen, it is desirable to avoid contact between the resin in the mould cavity and a user's eye. Provision of a second cavity ensures that such contact is avoided. The amount of liquid in the second cavity is adjusted to provide the desired correction; this second cavity serves as a master cavity to which the mould cavity is slaved, allowing the mould cavity to produce a lens to correct the user's vision.

There may be some change in the refractive index of the resin during curing. It is therefore preferred for the method to comprise a further step of adjusting the amount of resin in the mould cavity, after the amount has been adjusted in accordance with the user's requirements, to allow for changes in refractive index occurring when said resin is cured.

The transparent resin may be a thermosetting resin which can be cured by exposure to heat. Alternatively, the transparent resin may be a UV-curable resin which can be cured by exposure to ultraviolet radiation (which may be in the form of ambient light or sunlight). In a further alternative form, the lens can be formed from a transparent silicone rubber; such a material will not set hard (like a thermosetting resin or a UV-curable resin), but can still be used to form a usable lens.

A preferred embodiment of the invention will now be described by way of example only and with reference to the accompanying drawings, in which.

Figure 4:
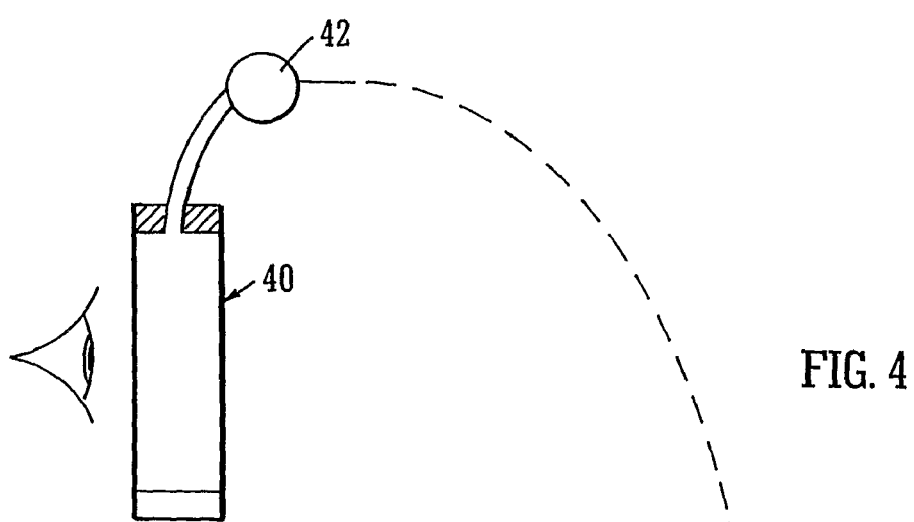

and FIG. 4 shows a device for use with a further method, with a master cavity and a slave mould cavity.

Figure 1:
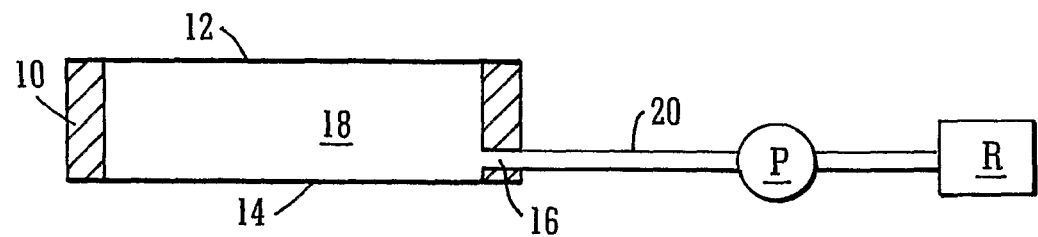
FIG. 1 shows a cross-section of a mould cavity in which a lens is moulded according to a first method.
Figure 2:
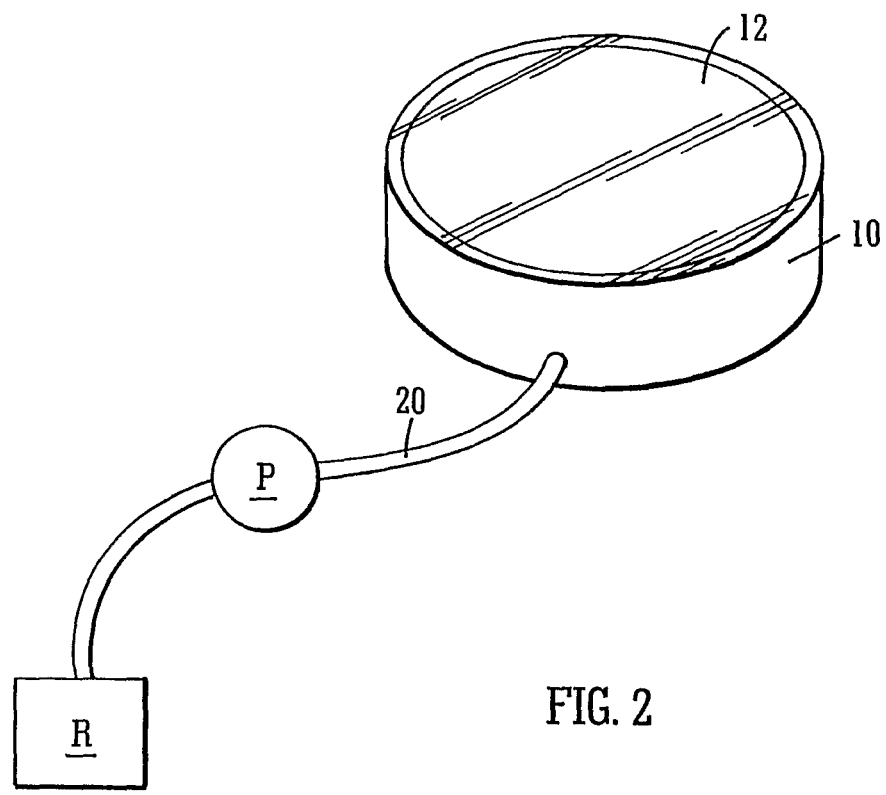
FIG. 2 is a perspective view of the mould of FIG. 1.

As can be seen from FIG. 1, a mould cavity used in a first embodiment of the method comprises two sheets 12, 14 attached to either side of a ring 10. The ring 10 may be circular, or may have any suitable closed-loop shape. Both of the sheets 12, 14 are transparent, and in this embodiment both are flexible, although it is also possible to use a cavity in which one of the sheets is flexible and the other sheet is rigid.

A hole 16 is formed through the ring 10, allowing liquid to be introduced into the space 18 between the sheets 12, 14. This hole is connected to a duct 20, which is in turn in communication with a pump P and a reservoir R of transparent resin. The resin may be a thermosetting resin, or may be cured through exposure to UV radiation. UV-curable resins of this type which are suitable for the moulding of lenses are known, and several such resins are disclosed in WO 00/05060. If the resin is UV-curable, then it is preferred for the reservoir and the piping connecting it to the cavity to be substantially opaque to UV radiation. Similarly, if the resin is a thermosetting resin, then the moulding apparatus should be maintained at a temperature below the setting temperature of the resin.

The pump P can be used to pump resin from the reservoir R into the space 18, to deform the sheets and thus change the shape of the space and the optical properties of the lens to be moulded therein. The pump P can also be used to draw resin out of the space and back into the reservoir.

Figure 3:
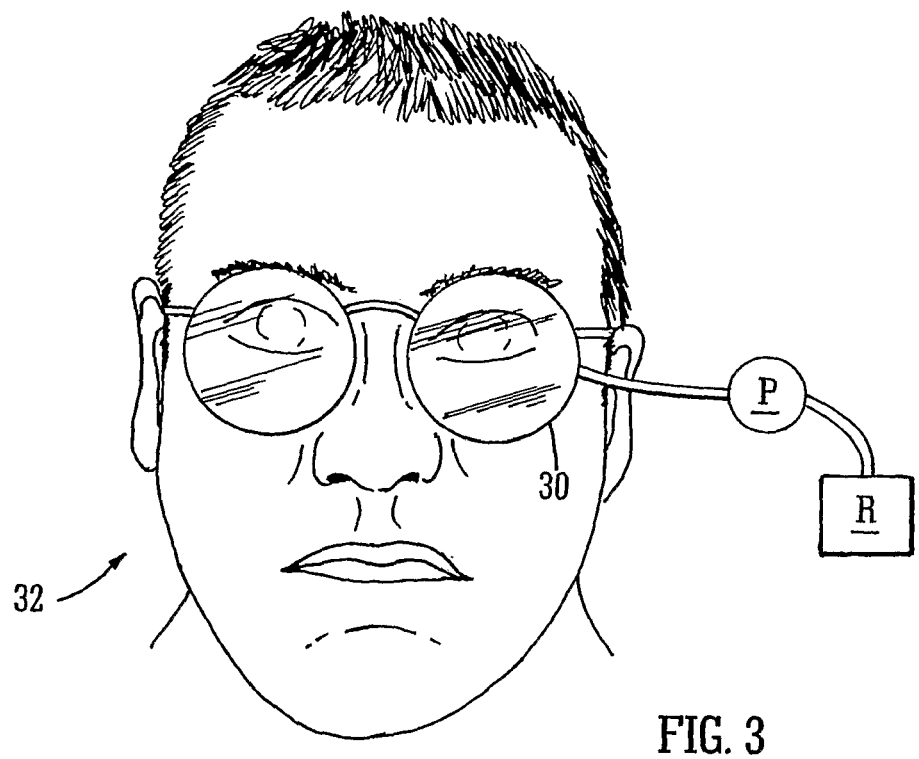
FIG. 3 shows a device incorporating two mould cavities.

As shown in FIG. 3, the mould cavity can be provided in an apparatus 30 resembling a pair of spectacles. In use, the apparatus is positioned such that the cavity is in front of the eye of a user 32, in the same position as a spectacle lens would be.

Resin is introduced into the cavity by means of the pump P. The resin-filled cavity, by virtue of the flexible sheets, can then function as a variable focus lens. Such lenses are well-known and will not be described in detail here. By varying the amount of resin in the cavity, the user can vary the curvature of the flexible sheets, and thus the power of the lens, until the desired power necessary for accurate correction of vision is arrived at. This procedure is simplified if the cavity is positioned in front of a user's eye (in the same manner as a spectacle lens), as the user can adjust the amount of resin in the cavity while looking through it until correct focus is achieved.

The resin in the cavity can then be cured, either through exposure to heat or exposure to UV radiation, thus producing a lens. If a UV-curable resin is used, then depending on the particular resin, the amount of UV radiation in ambient sunlight can be sufficient to cause the resin to cure; alternatively, the resin can be exposed to UV radiation from a bulb or the like.

Once the resin has cured, the lens can be removed from the cavity, and installed in a standard spectacle frame or the like. Alternatively, if the cavity is provided in an apparatus resembling a pair of spectacles, as mentioned above with reference to FIG. 3, the lens can remain in the apparatus, which can then be used as a pair of spectacles.

Depending on the type of resin used, the refractive indices of the resin in its uncured and cured states may differ. In order to accommodate the change in refractive index, a small amount of resin can be introduced into or removed from the cavity after it has been adjusted in accordance with the eventual user's wishes. The exact amount required can be calculated based on the amount of resin in the cavity and the change in refractive index.

It is of course important to avoid any contact between the resin and the user's skin, and in particular, eyes. This is not normally an issue, as the resin should remain in the mould during normal use. However, there is a possibility that the resin may leak where the sheets are joined to the ring, or that the sheets may tear or burst during use (for example, if too much resin is introduced into the mould). This could lead to the resin coming into contact with the user, which is extremely undesirable.

The embodiment shown in FIG. 4 is intended to overcome this problem.

In this embodiment, the user does not look directly through the mould 10 containing the resin, which remains some distance away from the user's eyes. Instead, the user looks through a second cavity 40, which is connected to the mould 10. The second cavity 40 is formed in a similar manner to the mould, in that it is in the form of a variable focus lens, and the amount of liquid in the second cavity can be adjusted to provide vision correction (for example, using a hand-operated pump 42, a syringe or the like).

The mould 10 is slaved to the second cavity 40, so that the amount of resin in the mould 10 is adjusted in accordance with the amount of liquid in the second cavity 42. In other words, when liquid is introduced into the second cavity 42 to vary its focus, resin is also introduced into the mould 10. Likewise, when liquid is removed from the second cavity 42, resin is removed from the mould 10. This can be achieved by mounting sensors on the hand-operated pump 42 used to adjust the amount of liquid in the second cavity, and using information detected by these sensors to control the pump P for the mould (shown schematically in FIG. 4 by a dotted line connecting the hand-operated pump 42 with the resin pump P).

Once the amount of liquid in the second cavity 42 has been adjusted to provide proper correction, the mould 10 can be sealed, and the resin cured to produce a lens. (Of course, resin can be introduced into or removed from the mould after adjustment, in order to correct for variations in refractive index on curing as discussed above.)

The liquid used in the second cavity through which the user looks should be such it will cause no harm if it comes into contact with a user's skin or eyes. Water can be used, as can certain oils. It will of course be necessary to adjust the amount of resin to take into account the differences in refractive index between the resin and the liquid.

It will be appreciated that further variations are also possible. For example, a moulding apparatus could be provided in the form of a pair of spectacles with two such second cavities, positioned in front of each of a user's eyes, and two moulds (again in the form of a pair of spectacles), so that a pair of corrective spectacles could be produced without the risk of resin coming into contact with the user's skin or eyes.

The invention claimed is:

1. A method of moulding a lens for correction of vision from a transparent resin, the method comprising:
providing a mould cavity in which the lens is to be moulded, the sides of the cavity which correspond to the front and rear surfaces of the lens being formed by two sheets, at least one of which is flexible;
filling the mould cavity with a transparent resin;
adjusting the amount of resin in the cavity to thereby deform the flexible sheet(s) so that the shape of the lens defined by the sheet(s) will provide a desired power; and
curing the resin,
wherein said sheets are transparent, and
the adjustment of the amount of resin in the cavity to deform the flexible sheet(s) is carried out while the eventual user of the lens is looking through the transparent sheets and the resin, so that the shape and power of the lens can be adapted to suit to the eventual user's vision.

2. The method as claimed in claim 1, wherein said mould cavity is provided in an optical apparatus.

3. The method as claimed in claim 2, wherein a second mould cavity is provided in said optical apparatus.

4. A method of moulding a lens for correction of vision from a transparent resin, the method comprising:
providing a mould cavity in which the lens is to be moulded, the sides of the cavity which correspond to the front and rear surfaces of the lens being formed by two sheets, at least one of which is flexible;
filling the mould cavity with a transparent resin;
adjusting the amount of resin in the cavity to thereby deform the flexible sheet(s) so that the shape of the lens defined by the sheet(s) will provide a desired power; and
curing the resin,
providing a second cavity having front and rear surfaces formed from transparent sheets, at least one of the sheets being flexible, the flexibility of the sheets of the second cavity corresponding to the flexibility of the corresponding sheets in the mould cavity, the second cavity being filled with a transparent liquid;
wherein the eventual user of the lens looks through the second cavity, the amount of liquid in the second cavity being adjusted to thereby deform the flexible sheet(s) so that the shape of the lens defined by the sheet(s) will provide a desired power; and the amount of resin in the mould cavity is adjusted in correspondence with the amount of liquid in the second cavity.

5. The method as claimed in claim 1, comprising a further step of adjusting the amount of resin in the mould cavity, after the amount has been adjusted in accordance with the user's requirements, to allow for changes in refractive index occurring when said resin is cured.

6. The method as claimed in claim 1, wherein said transparent resin is a thermosetting resin which is curable by exposure to heat.

7. The method as claimed in claim 1, wherein said transparent resin is a UV-curable resin which is curable by exposure to ultraviolet radiation.

8. The method as claimed in claim 1, wherein said transparent resin is a transparent silicone rubber.

9. The method as claimed in claim 2, wherein the optical apparatus comprises a pair of spectacles.

* * * * *